(12) United States Patent
Upton

(10) Patent No.: US 6,553,161 B1
(45) Date of Patent: Apr. 22, 2003

(54) MAGNETIC FLUID-BASED POSITIONING APPARATUS AND METHOD

(75) Inventor: Eric Lawrence Upton, Bellevue, WA (US)

(73) Assignee: Terabeam Corporation, Kirkland, WA (US)

( * ) Notice: Subject to any disclaimer, the term of this patent is extended or adjusted under 35 U.S.C. 154(b) by 164 days.

(21) Appl. No.: 09/805,763

(22) Filed: Mar. 13, 2001

(51) Int. Cl.7 .................................................. G02B 6/26
(52) U.S. Cl. ................. 385/25; 385/6; 385/39
(58) Field of Search .............................. 385/11, 14, 25, 385/6, 27, 42, 39

(56) References Cited

U.S. PATENT DOCUMENTS 4,384,761 A * 5/1983 Brady et al. .................. 385/23
4,475,033 A * 10/1984 Willemsen et al. ...... 250/201.1
5,890,789 A * 4/1999 Inagaki et al. .............. 359/305

* cited by examiner

Primary Examiner—Robert H. Kim
Assistant Examiner—Michael H Caley
(74) Attorney, Agent, or Firm—Blakely Sokoloff Taylor & Zafman LLP

(57) ABSTRACT

An apparatus and method for controlling a coordinate position and/or orientation of a stylus. The apparatus functions by positioning an armature coupled to the stylus, which is disposed within a magnetic fluid. The magnetic fluid is contained within a cavity defined in a non-magnetic body. A controllable active magnetic field-generating structure disposed in proximity to the cavity is used to generate a variable magnetic field that acts upon the magnetic fluid, causing it to be displaced, thereby enabling the armature to be moved to a desired coordinate position and/or orientation. In one implementation, the invention may be used in free space optical communication systems, whereby the stylus comprises the end portion of a fiber optic cable that may be positioned so as to maximize the energy levels of both transmitted and received optical signals.

26 Claims, 12 Drawing Sheets

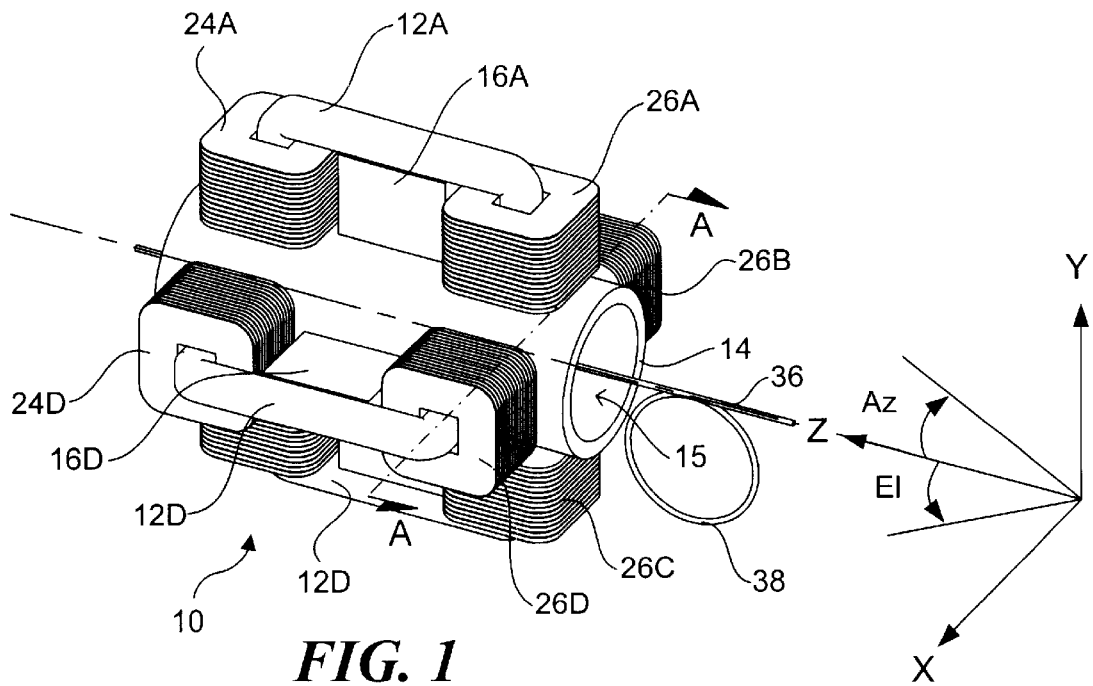
FIG. 1
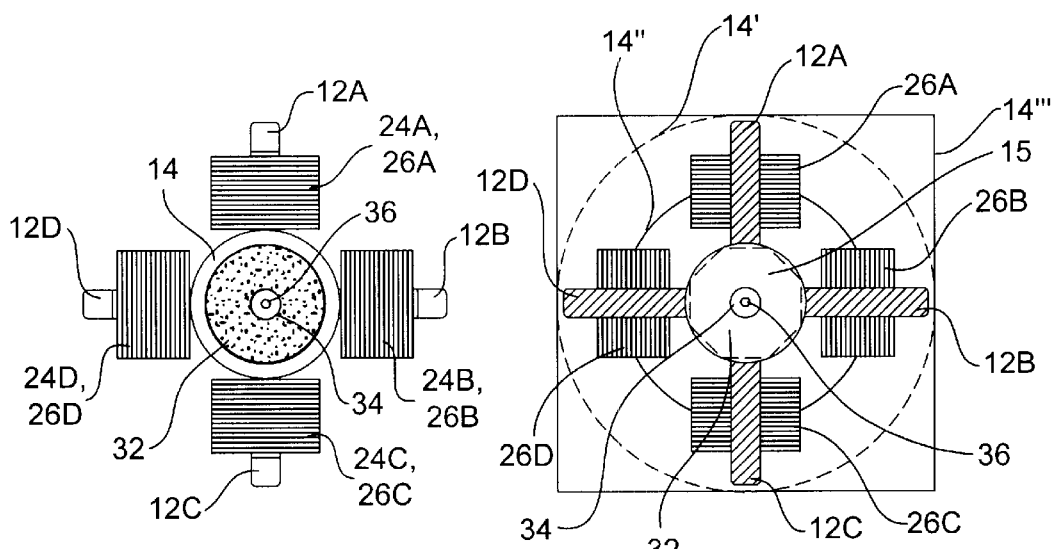
FIG. 3A  FIG. 3B

Positional Force $F_X = K (I_{LX} + I_{TX})$ (1)

$F_Y = K (I_{LY} + I_{TY})$ (2)

$F_Z = K \{(I_{LX} + I_{LY}) - (I_{TX} + I_{TY})\}$ (3)

Positional Torque $T_{EL} = K (I_{LY} - I_{TY})$ (4)

$T_{AZ} = K (I_{LX} - I_{TY})$ (5)

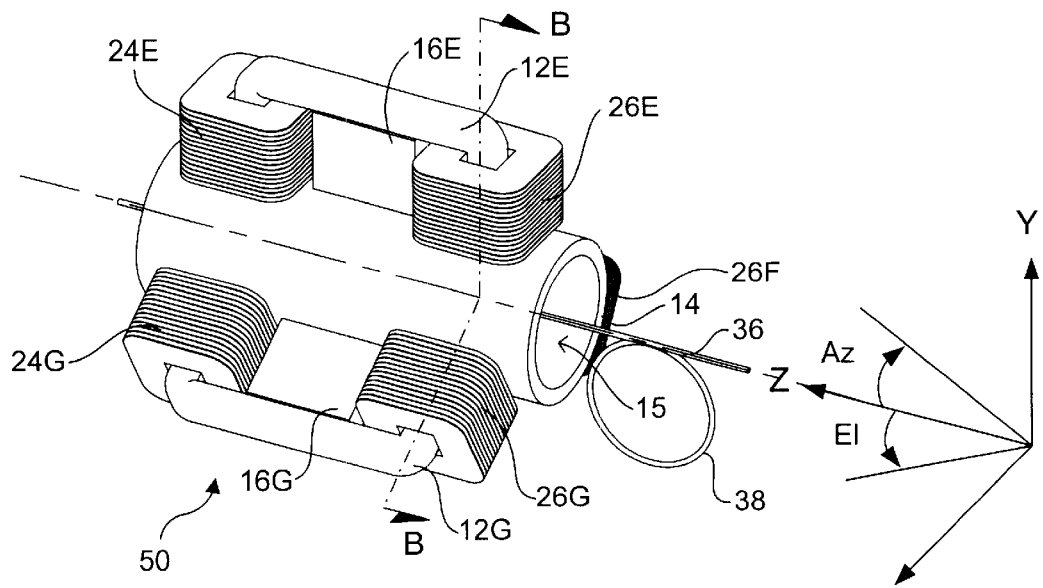
FIG. 5
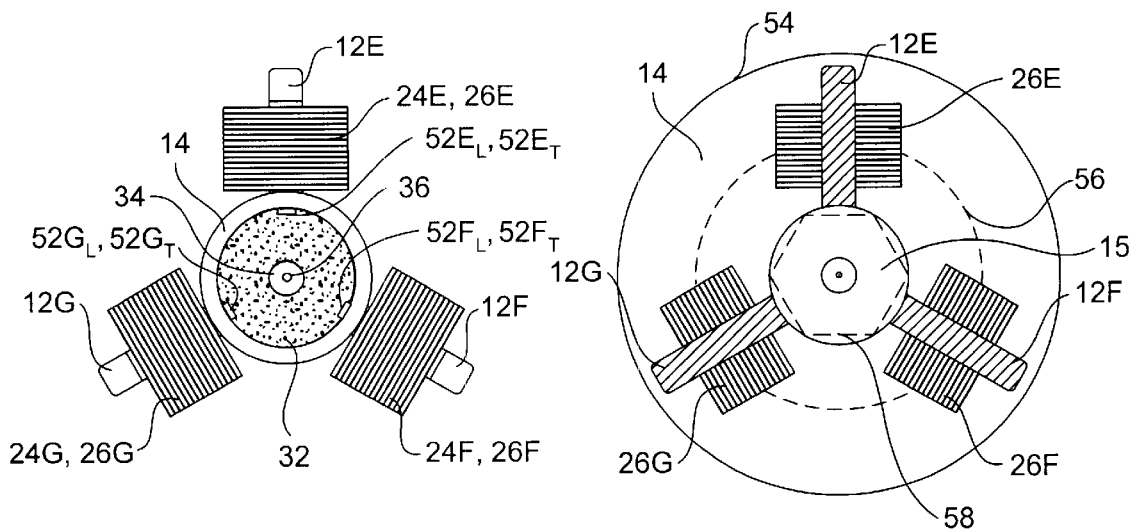
FIG. 7A  FIG. 7B

MAGNETIC FLUID-BASED POSITIONING APPARATUS AND METHOD

BACKGROUND OF THE INVENTION

1. Field of the Invention

The present invention relates to positioning devices and, more specifically, the present invention relates to a positioning device for optical communications systems.

2. Background Information

With the increasing popularity of wide area networks (WANs), such as the Internet and/or the World Wide Web, network growth and traffic has exploded in recent years. Network users continue to demand faster networks and more access for both businesses and consumers. As network demands continue to increase, existing network infrastructures and technologies are reaching their limits.

An alternative to present day hardwired or fiber network solutions is the use of wireless optical communications. Wireless optical communications utilize point-to-point communications through free space and therefore do not require the routing of cables or fibers between locations. Thus, wireless optical communications are also known as free space or atmospheric optical communications. For instance, in a free space optical communication system, a beam of light is directed through free space from a transmitter at a first location to a receiver at a second location. Data or information is encoded into the beam of light, and therefore, the information is transmitted through free space from the first therefore, the information is transmitted through free space from the first location to the second location.

An important aspect of a free space optical communications system is tracking. In particular, it is important that the optical communications beam (e.g., laser beam) is aimed properly from the transmitter at the first location and that the receiver at the second location is aligned properly to receive the optical communications beam. For example, assume that a transmitter is mounted on a first building and that a receiver is mounted on a different second building. Assume further that there is a line of sight between the transmitter and receiver. It is important for the transmitter on the first building to be configured to accurately direct or aim the optical communications beam at the receiver on the second building.

Tracking is utilized for maintaining the alignment of the optical communications beam between the transmitter and receiver in various situations or disturbances. Examples of these various situations or disturbances include the swaying of the buildings due to for example windy conditions, vibration of the platforms on which the transmitter and/or receiver are mounted, atmosphere-induced beam steering, etc. If the tracking system is unable to compensate for disturbances, the optical communications beam is no longer properly aimed at the receiver and, consequently, communications between the transmitter and receiver are lost or impaired.

SUMMARY OF THE INVENTION

The present invention provides an apparatus and method for controlling a coordinate position and/or orientation of a stylus. The apparatus functions by positioning an armature to which the stylus is coupled. The armature is disposed within a magnetic fluid that causes the armature to be moved when the magnetic fluid is displaced by varying a magnetic field acting upon the magnetic fluid. In one implementation, the invention may be used in free space optical communication systems, wherein the stylus comprises the end portion of a fiber optic cable, and whereby positioning the end portion of the fiber optic cable enables the signal strength of both transmitted and received optical signals to be maximized.

According to a first aspect of the invention, the apparatus comprises a non-magnetic body that includes a cavity in which the magnetic fluid is held. A controllable active magnetic field-generating structure disposed in proximity to the cavity is used to generate the variable magnetic field that acts upon the magnetic fluid, causing it to be displaced, thereby enabling the armature to be moved to a desired coordinate position and/or orientation. In one embodiment, the controllable active magnetic field-generating structure comprises a plurality of electromagnetic stators disposed about the centerline of the cavity. Preferably, the apparatus also includes a static electromagnetic field-generating structure that is used to maintain the magnetic fluid within the cavity when the controllable active magnetic field-generating structure is disabled.

In one configuration, three electromagnetic stators are radially arrayed around the cavity with an angular displacement of approximately 120 degrees apart. In an alternative configuration, four electromagnetic stators are radially arrayed around the cavity with an angular displacement of approximately 90 degrees apart. Each of the electromagnetic stators includes a leading and trailing electromagnetic comprising a plurality of coils disposed about a pair of arms of a U-shaped magnetic core. Preferably, the ends of the arms are disposed to be in contact with the magnetic fluid and located such that they are disposed toward opposing ends of the armature. When the coils are supplied with current, various electromagnetic circuits are formed, wherein each magnetic circuit includes portions of the magnetic fluid. As a result, a controllable variable magnetic field is produced by controlling the currents supplied to the various electromagnets. The controllable variable magnetic field may then be used to move the armature to a desired position by displacement of the magnetic fluid. In addition, a tandem configuration is provided that enables both receiving and transmitting end portions of fiber optic cables to be positioned by a single device.

According to a second aspect of the invention, an integrated position sensor is built into the apparatus and is used to determine the position of the sensor. The position sensor comprises a plurality of electrodes radially disposed about a conductor that is disposed about a mid-portion of the armature. In one embodiment, the plurality of electrodes include a leading set of coplanar electrodes, and a trailing set of coplanar electrodes, wherein the leading set of electrodes is disposed toward one end of the conductor, and the trailing set of electrodes are disposed toward the opposite end. The magnetic fluid provides an electrical path between the electrodes and the conductor, wherein the resistance of the path is substantially proportional to the distance between a closest end of the conductor and each electrode. As a result, as the armature is displaced, the resistances change. By calculating the resistances, the position of the conductor, and thus the armature, can be determined.

According to another aspect of the invention, a servo control loop is provided that supports both an Acquire mode and a Tracking mode. In the Acquire mode, the armature can be moved to a desired coordinate position and/or orientation. In the tracking mode, a signal strength (i.e., energy level) corresponding to an optical signal transmitted from or received by the fiber optic cable is maintained at a maximum value by fine tuning the position of the end portion of the fiber optic cable based on a signal strength feedback signal.

According to still further aspects of the invention, a method is provided for positioning a stylus in accordance with the foregoing apparatus.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 1 is an isometric view of a first exemplary configuration of an electromagnetic positioner in accord with the present invention;

FIG. 3A is an end view of the electromagnetic positioner of FIG. 1;

FIG. 3B shows an end view of various optional configurations of the non-magnetic body used in the electromagnetic positioner of FIG. 1;

FIG. 5 is an isometric view of a second exemplary configuration of an electromagnetic positioner in accord with the present invention;

FIG. 7A is an end view of the electromagnetic positioner of FIG. 5;

FIG. 7B is an end view of various optional configurations of the non-magnetic body used in the electromagnetic positioner of FIG. 5;

FIG. 10B is a block schematic diagram of second embodiment of an electrical circuit that may be implemented in the position sensor, wherein the position of the conductor is determined by measuring capacitances between various electrodes and the conductor; and FIGURES are 11A and 11B are block schematic diagrams of a servo control loop, wherein

DETAILED DESCRIPTION

Figure 2A:
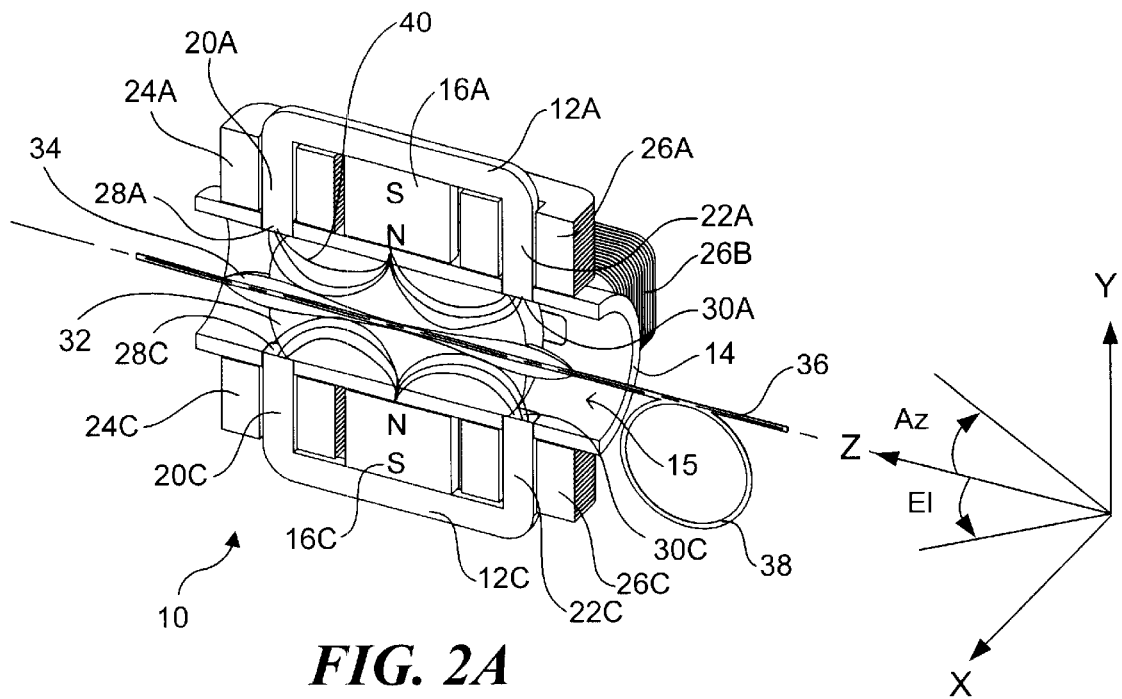
FIGS. 2A and 2B respectively show unhatched and hatched isometric cross-sections of the electromagnetic positioner of FIG. 1 taken along section cut A—A.
Figure 2B:
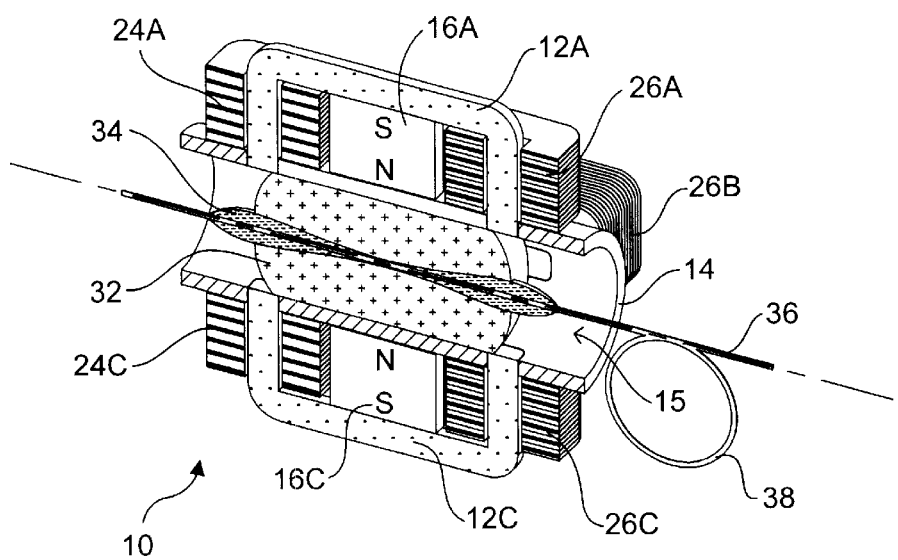

In one aspect of the present invention, methods and apparatuses for controlling the directional position of an optical beam in a free space optical communications system are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

In one example embodiment of the present invention, point-to-point free space optical communications are provided from a transmitter to a receiver. The transmitter and receiver may be located at the same location or at different locations such as on different buildings within a line of sight of each other. In one embodiment, the line of sight may include reflections off one or more reflective surfaces between the transmitter and receiver in accordance with the teachings of the present invention. It is appreciated that the transmitter and the receiver may be parts of transceivers, or transmitter-receiver combinations, at their respective locations, such that bi-directional communications are provided. In the example embodiment, the transmitter includes an optical source that generates an optical communications beam, such as a laser beam or the like, on which data or information is modulated. The optical communications beam is not limited to being monochromatic or to any particular wavelength or color and may include the visible light as well as ultra violet or infra-red portions of the spectrum.

In order to optimize signal strength, it is necessary to be able to continually control the position and/or orientation of an end portion of a fiber optic cable that is used for producing a transmitted optical signal or receiving an optical signal from an external transmitting source. Therefore, a positioning device is needed to control the position of the end portion of the fiber optic cable such that the signal strength of the transmitted signal and the received signal, as appropriate, is maximized. Furthermore, the positioning device needs to have very high bandwidth and be insensitive to vibrations.

An exemplary configuration of an electromagnetic positioner 10 corresponding to the present invention is shown in FIGS. 1, 2A–B, and 3A–B. Electromagnetic positioner 10 includes a four U-shaped magnetic cores 12A, 12B, 12C, and 12D radially arrayed approximately 90 degrees apart about the periphery of a tube-shaped non-magnetic body 14 in which a cavity 15 is defined. As used herein, a component that is labeled "magnetic" is made of a material that exhibits magnetic characteristic when exposed to a magnetic field, while a component labeled non-magnetic is made of a material that does not exhibit magnetic characteristic when exposed to a magnetic field. Electromagnetic positioner 10 further includes four magnets 16A, 16B, 16C, and 16D disposed adjacent to respective U-shaped magnetic cores 12A–D so as to form "E" configurations.

Each of magnetic cores 12A–D includes a pair of arms 20n and 20n around which respective windings 24n and 26n are disposed, wherein the "n" corresponds to the suffix of that magnetic core (e.g., magnetic core 12A would include arms 20A and 22A and windings 24A and 26A). As used herein and in the following claims, each sub-assembly comprising a magnetic core 12n and coils 24n and 26n is called an "electromagnetic stator."

Returning to magnetic cores 12n, each of arms 24n and 26n further include a respective end 28n, 30n in contact with a magnetic fluid 32 disposed within non-magnetic body 14. Preferably, cavity 15 for non-magnetic body 14 is formed such that the faces of ends 28A–D and 28A–D are substantially flush with the surrounding inner wall of non-magnetic body 14. For example, the apparatus may be manufactured by holding the magnetic stators in a jig a pouring a non-magnetic material into a mold that defines the external configuration of the non-magnetic body. As discussed below, the specific external configuration of non-magnetic body 14 is not critical. After the non-magnetic material is set, a boring operation may be applied to the non-magnetic body such that part of the ends 28n and 30n of cores 12n are removed.

An armature 34 having a longitudinal bore housing an end portion of a fiber optic cable 36 is disposed within magnetic fluid 32, which is "held" in cavity 15 by a static magnetic field, as discussed below. Preferably, armature 34 comprises a non-magnetic material, such as glass or a non-magnetic metal, and is formed in the shape of an elongated "8" rotated about the Z-axis or a similar configuration in which the cross-section of outer portions of the armature is larger than the cross section toward the center of the armature so as to create an inclined plane to enable armature 34 to be moved by magnetic fluid 32. In addition, it is preferable that fiber optic cable 36 includes a service loop 38 to enable armature 34 (and thus the end portion of the fiber optic cable) to freely move in the X, Y and Z directions, as well elevation (El) and azimuth (Az) orientations depicted in the Figures.

Magnetic fluid 32 may comprise one of several fluids that exhibit magnetic characteristics when exposed to a magnetic field. Such fluids include various magnetic fluids marketed under the trade name "ferrofluids," as well as other fluids in which magnetic particles are dispersed. As discussed above, each of magnetic cores 12A–D comprises a magnetic material, such as iron or various well-known magnetic alloys. As a result, the interaction between magnets 16A–D and magnetic cores 12A–D produces eight magnetic fields, as illustrated by magnetic flux lines 40. These magnetic fields are superimposed to generate a magnetic field in 3D space that holds a volume of magnetic fluid 32 within non-magnetic body 14. This enables magnetic fluid 32 to be held within cavity 15 under a normal non-powered condition, that is when there is no current is flowing through any of windings 24A–D or 26A–D.

Another characteristic of magnetic fluid 32 is that objects contained within the fluid may be displaced and/or rotated by varying a magnetic field passing through the fluid. Preferably, such objects will be non-magnetic such that they won't be affected by the magnetic field itself. As a result, a coordinate position of the armature 34 corresponding to a displacement relative to a superimposed X-Y-Z coordinate system may be controlled, as well as its elevation (i.e., pitch or tilt about the X axis) and azimuth (i.e., yaw or pan about the Y axis) orientations by controlling the current that flows through each of coils 24A–D and 26A–D.

Figure 4A:
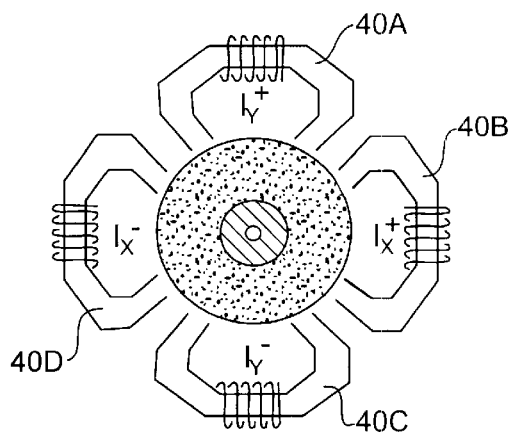
FIG. 4A is a schematic diagram and a corresponding set of equations for illustrating the effect of providing various currents to the electromagnets of the electromagnetic positioner of FIG. 1.
Figure 4B:
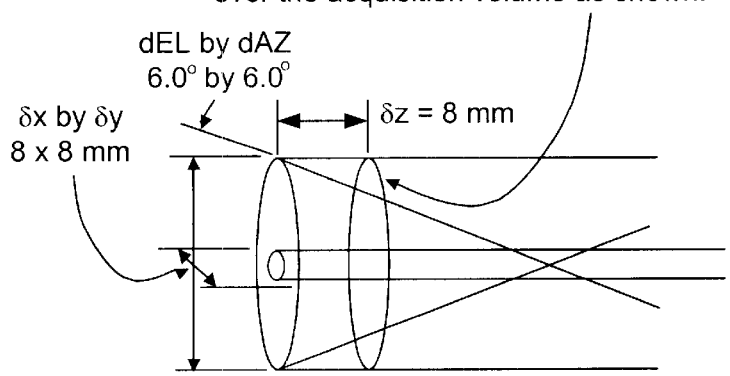
FIG. 4B illustrates an acquisition volume over which the armature of the electromagnetic positioner of FIG. 1.

The effect of applying various currents to coils 24A–D and 26A–D is modeled in FIG. 4A, wherein electromagnets 40n correspond to coils 24n and 26n, with the "L" subscript in the equations represents "leading" coils (i.e., coils 24n) and the "T" subscript represents "trailing" coils (i.e., coils 26n). The positional forces may be determined by the following equations:

$$F_X = K(I_{LX} + I_{TX}) \qquad (1)$$

$$F_Y = K(I_{LY} + I_{TY}) \qquad (2)$$

$$F_Z = K\{(I_{LX} = I_{LY}) - (I_{TX} + I_{TY})\} \qquad (3)$$

and the positional torque is defined by:

$$T_{EL} = K(I_{LY} - I_{TY}) \qquad (4)$$

$$T_{AZ} = K(I_{LX} - I_{TY}) \qquad (5)$$

wherein $I_{mn}$ represents the current flowing through a given coil and K is a magnetic constant that is a function of the magnetic characteristics of magnetic cores 12 and magnetic fluid 32, as well as various parameters of the coils themselves.

In the foregoing equations 1–5, $I_{mn}$ is the sum of values $I_{mn}^+ + I_{mn}^-$ depicted in FIG. 4A. For example, armature 34 can be caused to be displaced in the Y direction (due to a displacement of magnetic fluid 32) by having the current flowing through coils 24A and 26A be slightly greater than the current flowing through coils 24C and 26C (yielding $F_Y > 0$), while the currents flowing through coils 24B, 26B, 28B and 28D is substantially equal (yielding $F_X = 0$). Preferably, to obtain such a position without causing any rotation, the current in coils corresponding to each arm would be equal, i.e., the current flowing through arms 24A and 26A would be equal, while the current flowing through arms 24C and 26C would be equal. In a similar manner, armature 34 can be displaced along the X-axis by applying a different current through coils 24B and 26B than that passing through coils 24D and 26D, while the current flowing through coils 24A, 24C, 26A, and 26C is substantially equal.

As shown by equation (3), armature 34 can also be moved along the Z-axis, which has defined herein is superimposed along the centerline of cavity 15 defined in non-magnetic body 14. Moving armature 34 forward in the Z direction may be accomplished by applying a greater current to coils 24A–D than to coils 26A–D, wherein the currents in coils 24A–D are substantially equal, and the currents in coils 26A–D are substantially equal. Moving armature 32 backward is performed in a similar manner, except in this instance the greater current is applied to coils 26A–D rather than 24A–D.

Additionally, as shown by equations 4 and 5, armature 34 can also be pivoted (generally about its midpoint) so as to create a controlled elevation (EL) and/or azimuth (AZ) orientation, wherein elevation comprises an angular position in the YZ plane (i.e., a rotation about an axis parallel to the X axis), and azimuth comprises an angular position in the XZ plane (i.e., a rotation about an axis parallel to the Y axis).

In general, non-magnetic body 14 performs the function of a primary structure component having a cavity in which magnetic fluid 32 is disposed. Since non-magnetic materials are not affected by magnetic fields, the external shape of non-magnetic body 14 is not critical, as discussed above. For example, as depicted by non-magnetic bodies 14' and 14" in FIG. 3B, non-magnetic body 14 may have various cylindrical external configurations, as well as a cube-shaped external configuration, as depicted by a non-magnetic body 14'". Furthermore, the internal shape of non-magnetic body 14 may comprise a circular cross-section, octagon-shaped cross section, or one of many other configurations not shown. Furthermore, the internal cross-section need not be constant. However, it is preferable that the internal cross section be symmetrical about its centerline (i.e., the axis coincident to the Z-axis in most configurations), as it makes equations for modeling the behavior of magnetic fluid 32 easier to formulate.

Figure 6A:
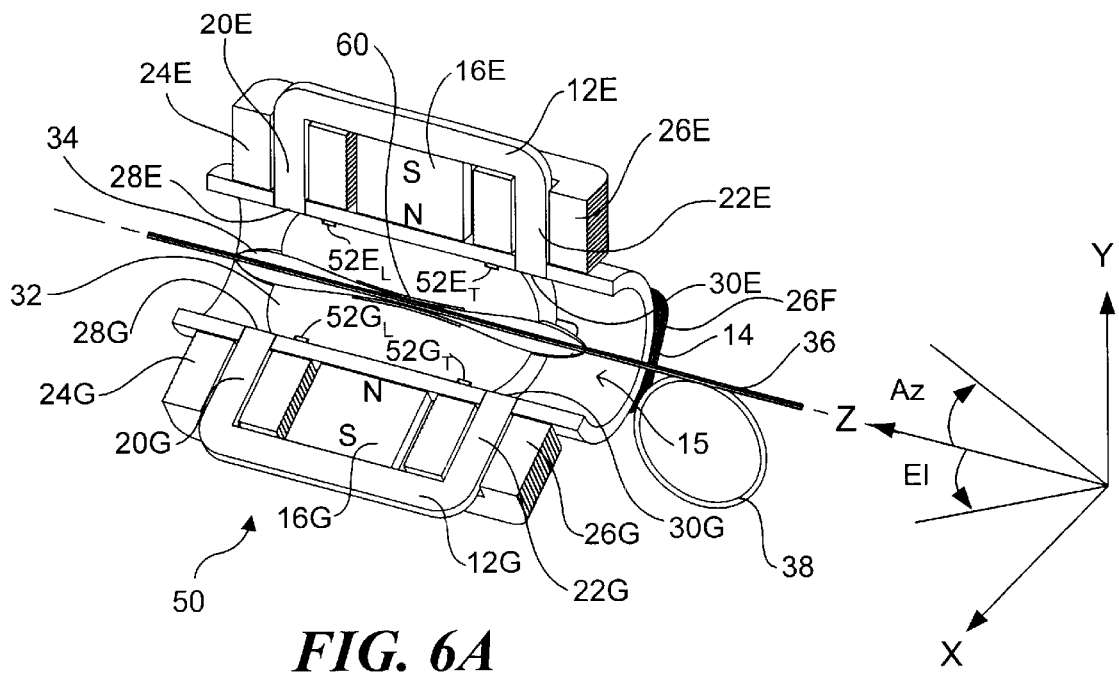
FIGS. 6A and 6B respectively show unhatched and hatched isometric cross-sections of the electromagnetic positioner of FIG. 5 taken along section cut B—B.
Figure 6B:
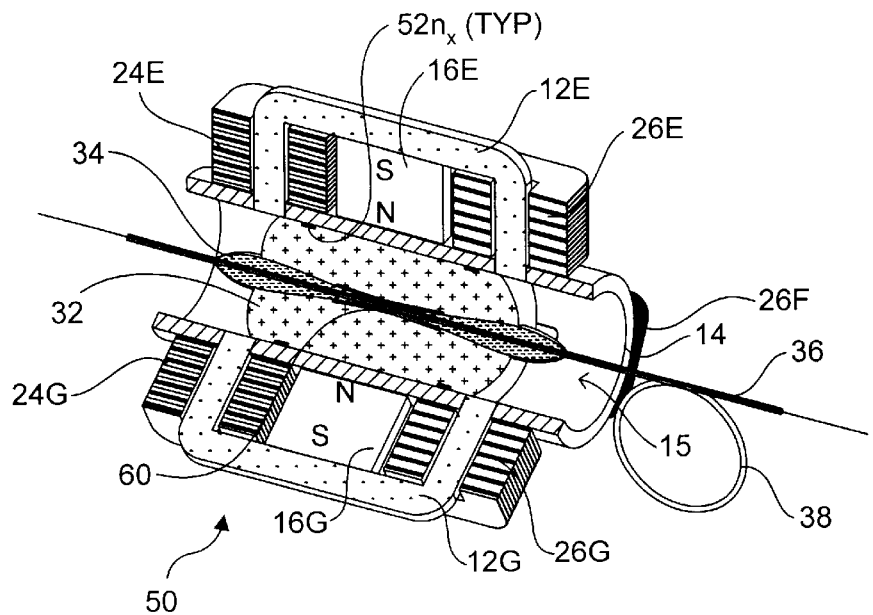
Figure 6C:
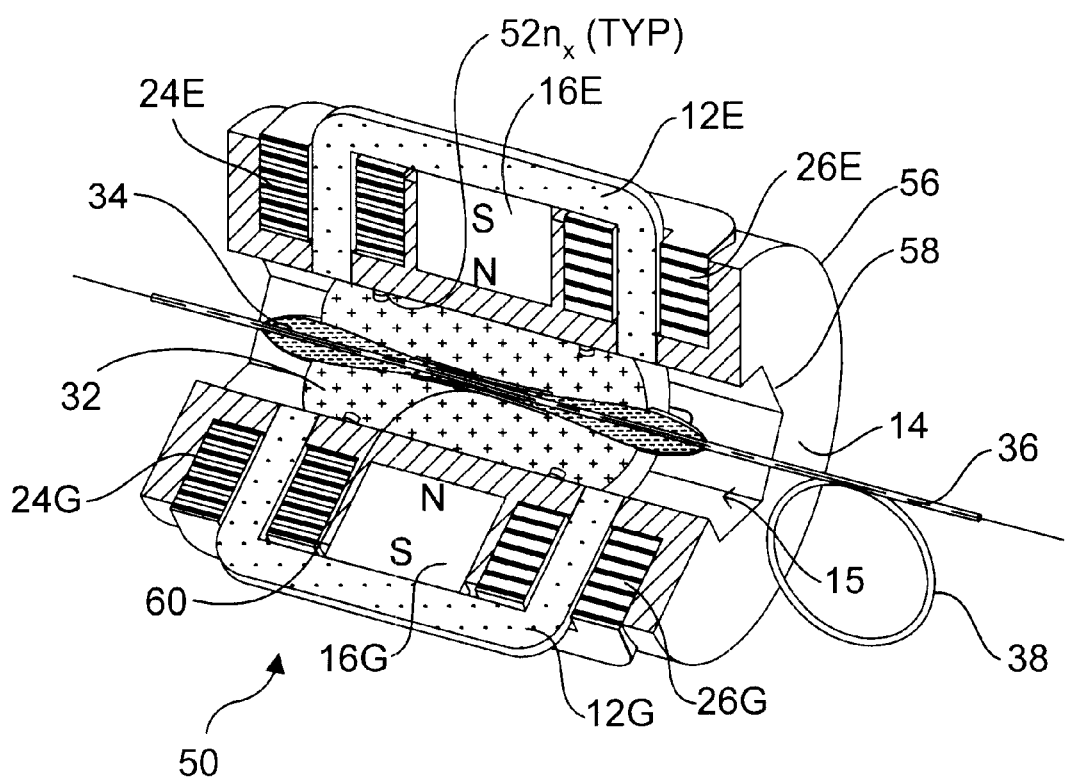
FIG. 6C shows a hatched isometric cross-section of the electromagnetic of an alternative configuration for the positioner of FIG. 5 taken along section cut B—B, wherein the cavity has a hexagonal profile.

An alternative configuration corresponding to a magnetic positioner 50 is shown in FIGS. 5A, 6A–C, and 7A–7B. In this configuration, three electromagnetic stators are radially arrayed around non-magnetic body 14 with an angular spacing of approximately 120 degrees. As depicted in FIGS. 5A, 6A–C, and 7A–7B, elements having a base reference number in common with elements discussed above perform substantially similar functions; these elements have suffixes "E", "F", and "G" in these FIGS. As shown in FIG. 7B, non-magnetic body 14 may comprise an external configuration 54 in which the other components of magnetic positioner 50 are completely contained, an external configuration 56 in which the other components are partially contained, or other configurations not shown. In addition, the internal configuration of non-magnetic body 14 may comprise a cylindrical bore or a hexagon 58, as shown in FIGS. 7B and 6C, as well as other configurations not shown.

Figure 8A:
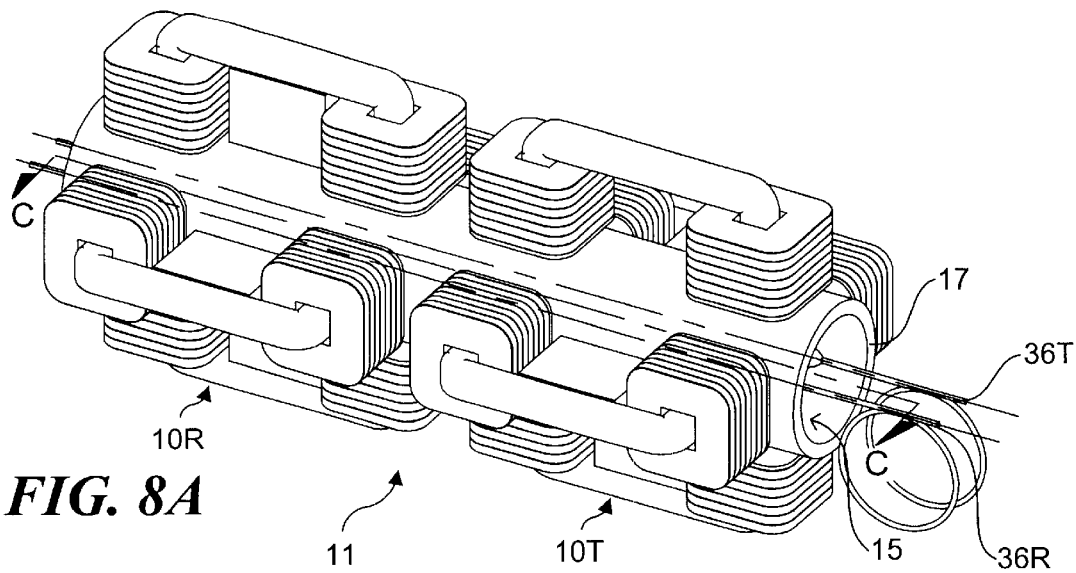
FIG. 8A is an isometric view of a third exemplary configuration of an electromagnetic positioner in accord with the present invention in which a pair of positioner components similar to that employed for the electromagnetic positioner of FIG. 5 are deployed in a tandem configuration.
Figure 8B:
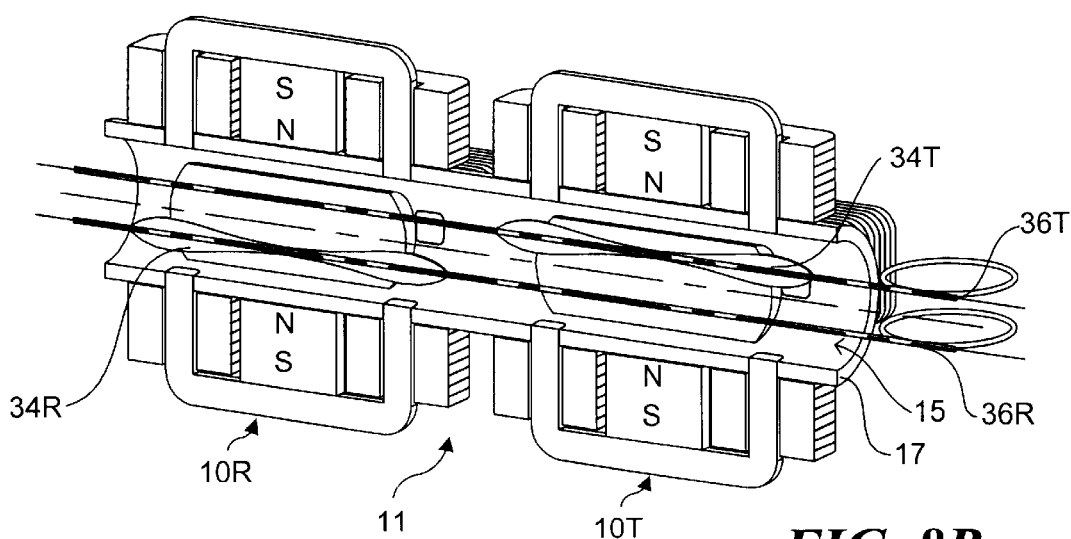
FIG. 8B shows an isometric cross-section of the electromagnetic positioner of FIG. 8A taken along section cut C—C.
Figure 8C:
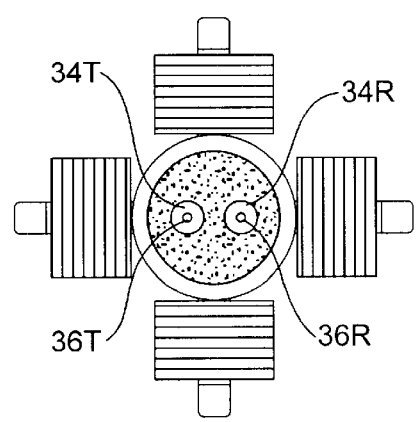
FIG. 8C shows an end view of the electromagnetic positioner of FIG. 8A.

A tandem electromagnetic positioner 11 that enables the alignment of end portions of a receiving fiber optic cable 36R and a transmitting fiber optic cable 36T is shown in FIGS. 8A–C. Tandem electromagnetic positioner 11 substantially comprises two electromagnetic positioners 10R and 10T placed end-to-end, wherein electromagnetic positioners 10R and 10T have configurations similar to electromagnetic positioner 10 discussed above, except that a single non-magnetic body 17 preferably is used instead of two non-magnetic bodies 14. Optionally, tandem electromagnetic positioner 11 may substantially comprise two electromagnetic positions having configurations similar to electromagnetic positioner 50 (not shown). In a manner similar to that discussed above, an armature 34R can be positioned by controlling the magnetic fields produced by the electromagnets in electromagnetic positioner 10R, while an armature 34T can be positioned by controlling the magnetic fields produced by the electromagnets in electromagnetic positioner 10T. As shown in FIG. 8C, armatures 34R and 34T are offset from one another so that positioning of one armature will not interfere with the positioning of the other armature.

The foregoing configurations may also be used to position other components in addition to an end portion of a fiber optic cable. In general, a stylus may be connected to armature 34 whereby the position of the stylus may be controlled by controlling the position of armature 34.

With reference to FIGS. 6A–C, 7A and 9A–B, magnetic positioner 50 may optionally include an integrated position sensing system that includes a plurality of electrodes $52n_x$, wherein the "n" corresponds to the nearest stator, and the "x" is either an "L" for leading, or a "T" for trailing. The system further includes a conductor 60 comprising a metal sheath or plating disposed around the center portion of armature 34.

Preferably, electrodes $52n_x$ are disposed within cavity 15 so as to be in electrical contact with magnetic fluid 32. In addition, each set of leading and trailing electrodes should preferably have coplanar configurations.

Figure 9A:
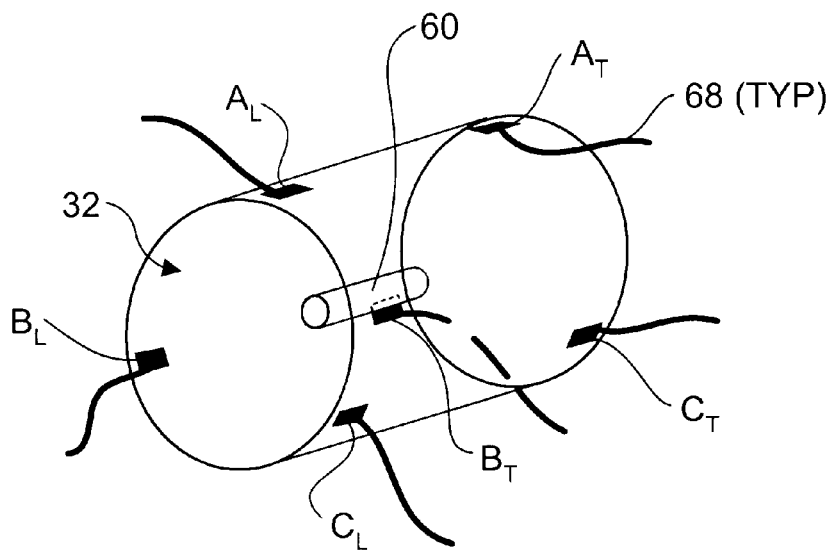
FIG. 9A is an isometric schematic diagram illustrating a configuration of the electrodes and conductor of the position sensor of the present invention.
Figure 9B:
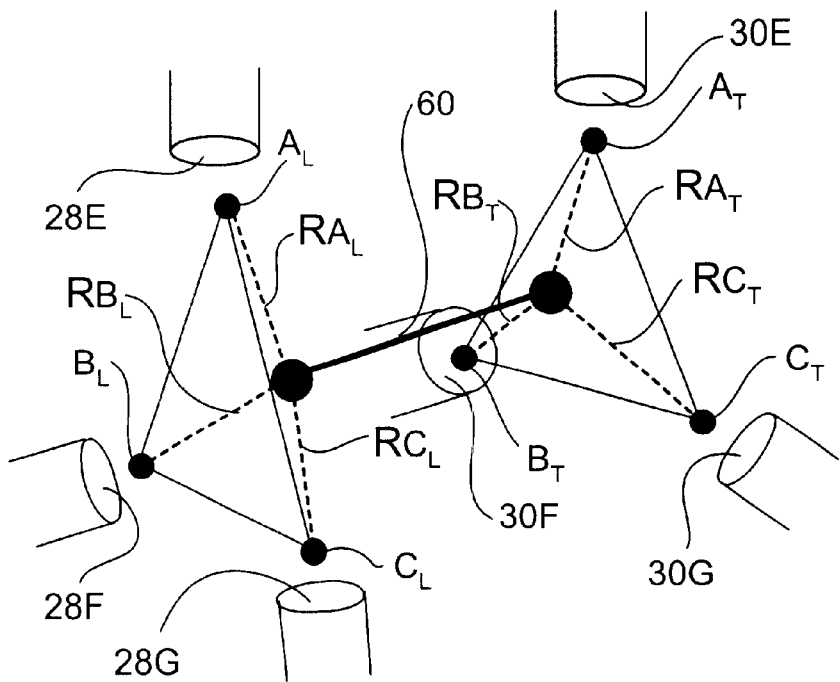
FIG. 9B is a schematic diagram illustrating the resistance paths measured during operation of the position sensor to determine the position of conductor.
Figure 10A:
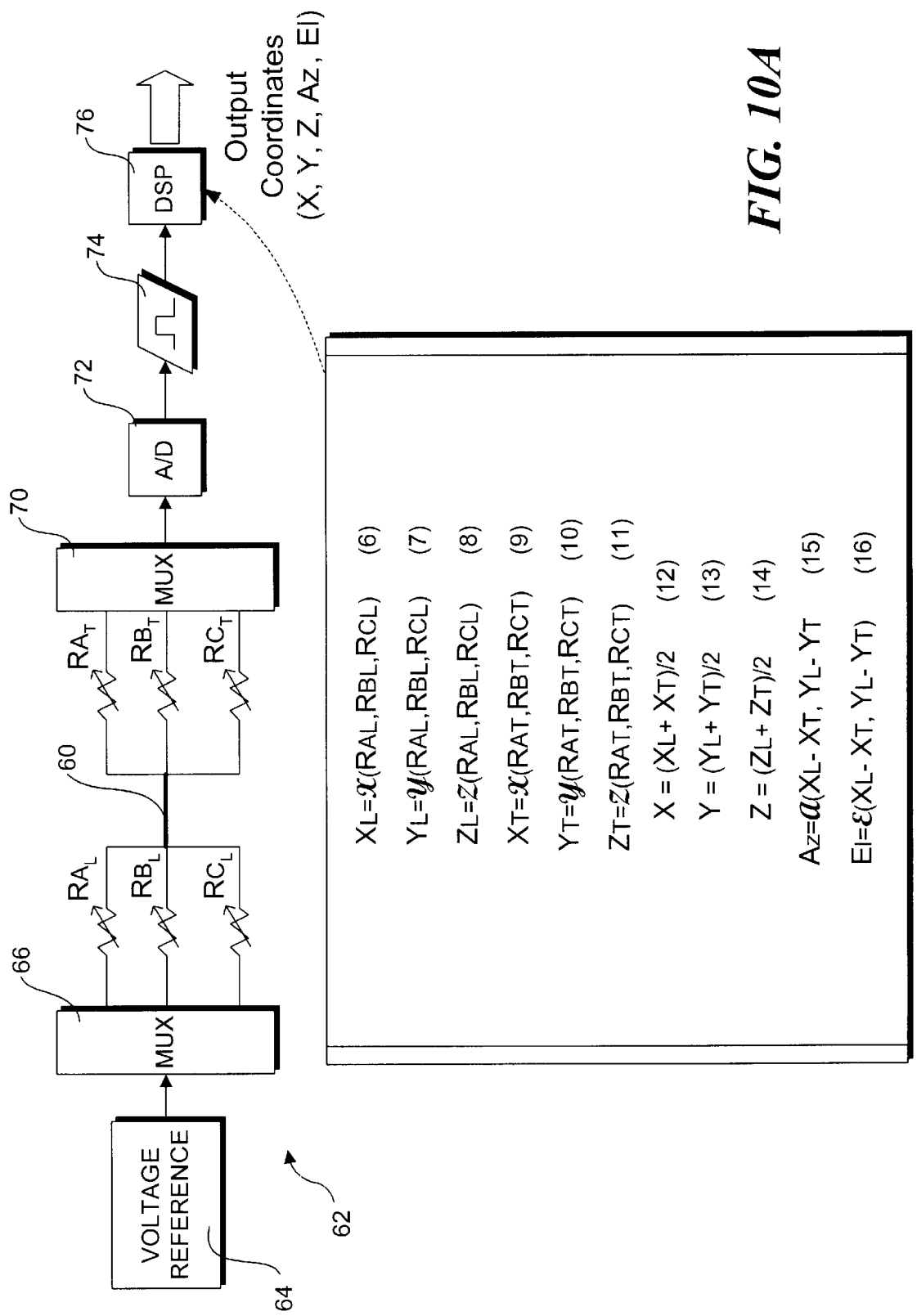
FIG. 10A is a block schematic diagram of first embodiment of an electrical circuit that may be implemented in the position sensor, wherein the position of a conductor is determined by measuring resistances between various electrodes and the conductor.
Figure 10B:
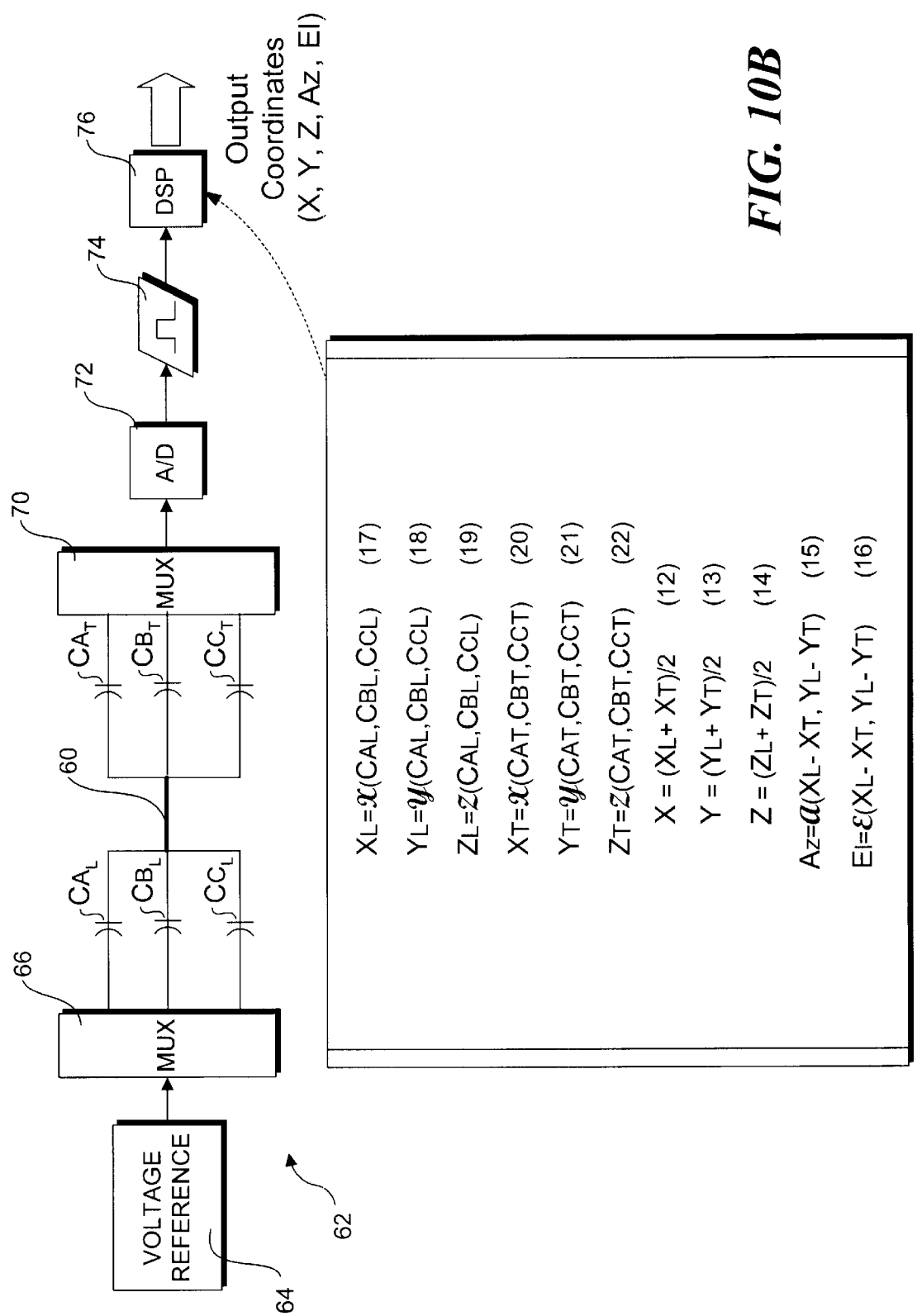

As illustrated in FIGS. 9A–B and 10A, the position sensing system works by measuring the resistance along electrical paths defined between each electrode and ends of conductor 60 nearest those electrodes. Alternatively, the capacitance across these paths may be measured in a similar matter, as shown in FIG. 10B. Although modeled as single resistances and capacitances, the actual resistance or capacitance between each electrode and the conductor comprise a plurality of paths having parallel resistances or capacitances, as applicable. For simplicity, these are modeled as single resistances and capacitances herein.

An exemplary signal processing circuit 62 for determining the resistance values is shown in FIG. 10A. Circuit 62 includes a voltage reference 64, and a first multiplexer 66 coupled to a free end of respective leads 68 connected to leading electrodes $52E_L$, $52F_L$, and $52G_L$. (Note, leads 68 are not shown in FIGS. 6A–C and 7A for clarity). Electrodes $52E_L$, $52F_L$, and $52G_L$ are electrically coupled to one end of conductor 60 by means of magnetic fluid 32. These couplings have resistances that are substantially proportional to the distance between each electrode and the end of the conductor, which are modeled by resistances RAL, RBL, and RCL.

Similarly, the other end of conductor 60 is coupled to electrodes $52E_T$, $52F_T$, and $52G_T$ by means of magnetic fluid 32, with the resistances being modeled by resistances RAT, RBT, and RCT. The coupled electrical signals are then received by a second multiplexer 70 at free ends of respective leads 68 corresponding to these trailing electrodes. The analog signals received by multiplexer 70 are then multiplexed into an analog-to-digital converter 72, which feeds digitized signal data 74 into a digital signal processor 76.

Digital signal processor 76 is used to process digitized signal data 74 to determined the values for resistances RAL, RBL, RCL, RAT, RBT, and RCT. Once these resistance values are known, the position of conductor 60 can be determined. For example, in one embodiment the position of conductor 60 can be determined using the following equations:

$$X_L = \mathcal{X}(\text{RAL,RBL,RCL}) \tag{6}$$

$$Y_L = \mathcal{Y}(\text{RAL,RBL,RCL}) \tag{7}$$

$$Z_L = \mathcal{Z}(\text{RAL,RBL,RCL}) \tag{8}$$

$$X_T = \mathcal{X}(\text{RAT,RBT,RCT}) \tag{9}$$

$$Y_T = \mathcal{Y}(\text{RAT,RBT,RCT}) \tag{10}$$

$$Z_T = \mathcal{Z}(\text{RAT,RBT,RCT}) \tag{11}$$

$$X = (X_L + X_T)/2 \tag{12}$$

$$Y = (Y_L + Y_T)/2 \tag{13}$$

$$Z = (Z_L + Z_T)/2 \tag{14}$$

$$A_Z = \mathcal{A}(X_L - X_T, Y_L - Y_T) \tag{15}$$

$$E_l = \mathcal{E}(X_L - X_T, Y_L - Y_T) \tag{16}$$

Equations 6–11 and 15–16 may be solved simultaneously using well-known techniques, such as linear algebra matrix processing, to yield a solution set from which the linear position of armature 34 along the X, Y, and Z axis and an elevation (El) an azimuth (Az) of armature 34 relative to the Z axis can be derived.

As discussed above, the position of conductor 60 can also be determined by using capacitance measurements rather than resistance measurements. As illustrated the signal processing circuit of FIG. 10B, a similar process to that described above in the resistance measurement method may be implemented to determine the coordinate position and/or orientation of conductor 60, wherein the values of capacitances CAL,CBL, CCL, CAT,CBT, and CCT are solved for using the following equations.

$$X_L = \mathcal{X}(\text{CAL,CBL,CCL}) \quad (17)$$

$$Y_L = \mathcal{Y}(\text{CAL,CBL,CCL}) \quad (18)$$

$$Z_L = \mathcal{Z}(\text{CAL,CBL,CCL}) \quad (19)$$

$$X_T = \mathcal{X}(\text{CAL,CBL,CCL}) \quad (20)$$

$$Y_T = \mathcal{Y}(\text{CAL,CBL,CCL}) \quad (21)$$

$$Z_T = \mathcal{Z}(\text{CAT,CBT,CCT}) \quad (22)$$

$$X = (X_L + X_T)/2 \quad (12)$$

$$Y = (Y_L + Y_T)/2 \quad (13)$$

$$Z = (Z_L + Z_T)/2 \quad (14)$$

$$A_Z = \mathcal{A}(X_L - X_T, Y_L - Y_T) \quad (15)$$

$$E_f = \mathcal{E}(X_L - X_T, Y_f - y_T) \quad (16)$$

Figure 11A:
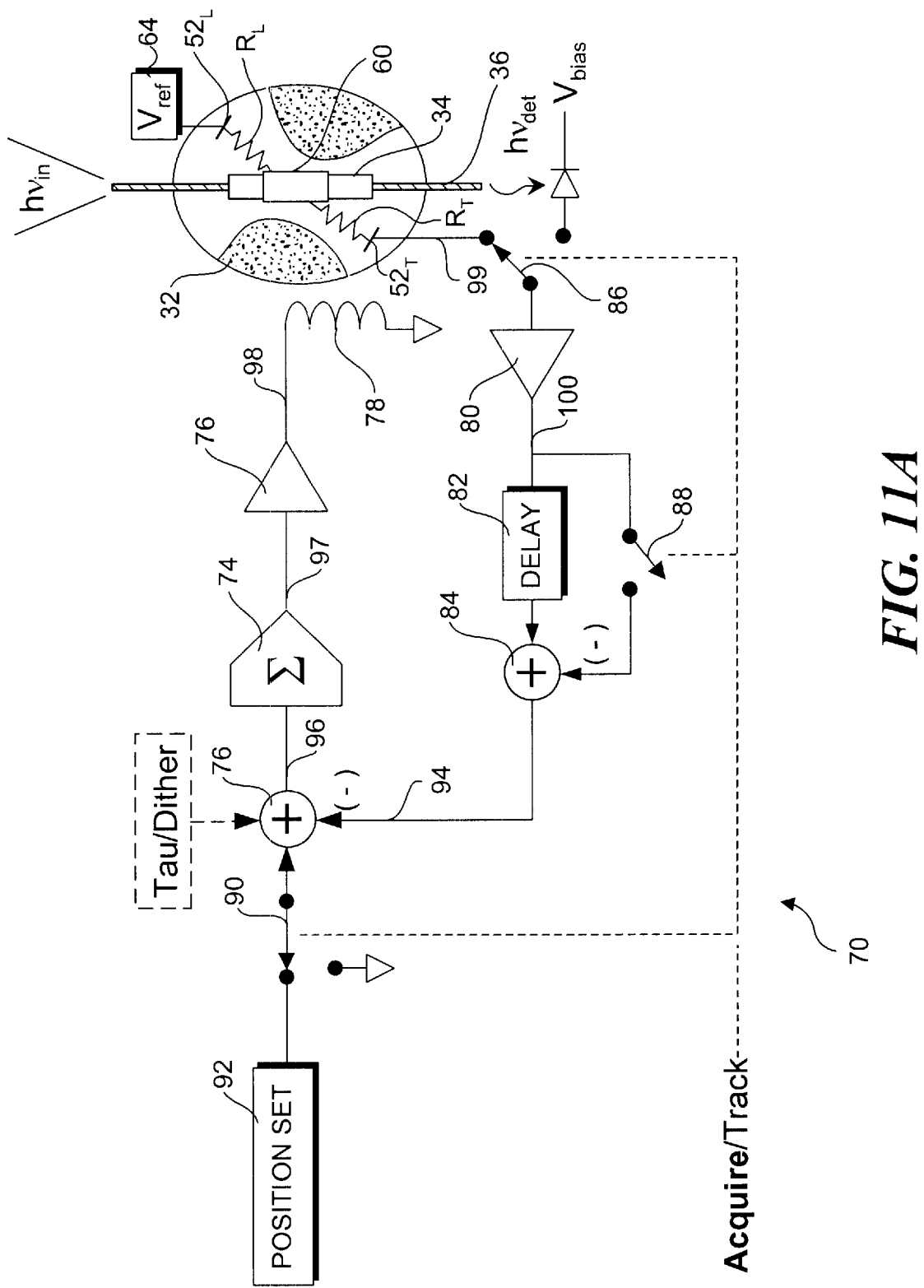
FIG. 11A depicts the control loop when used during an Acquire mode.
Figure 11B:
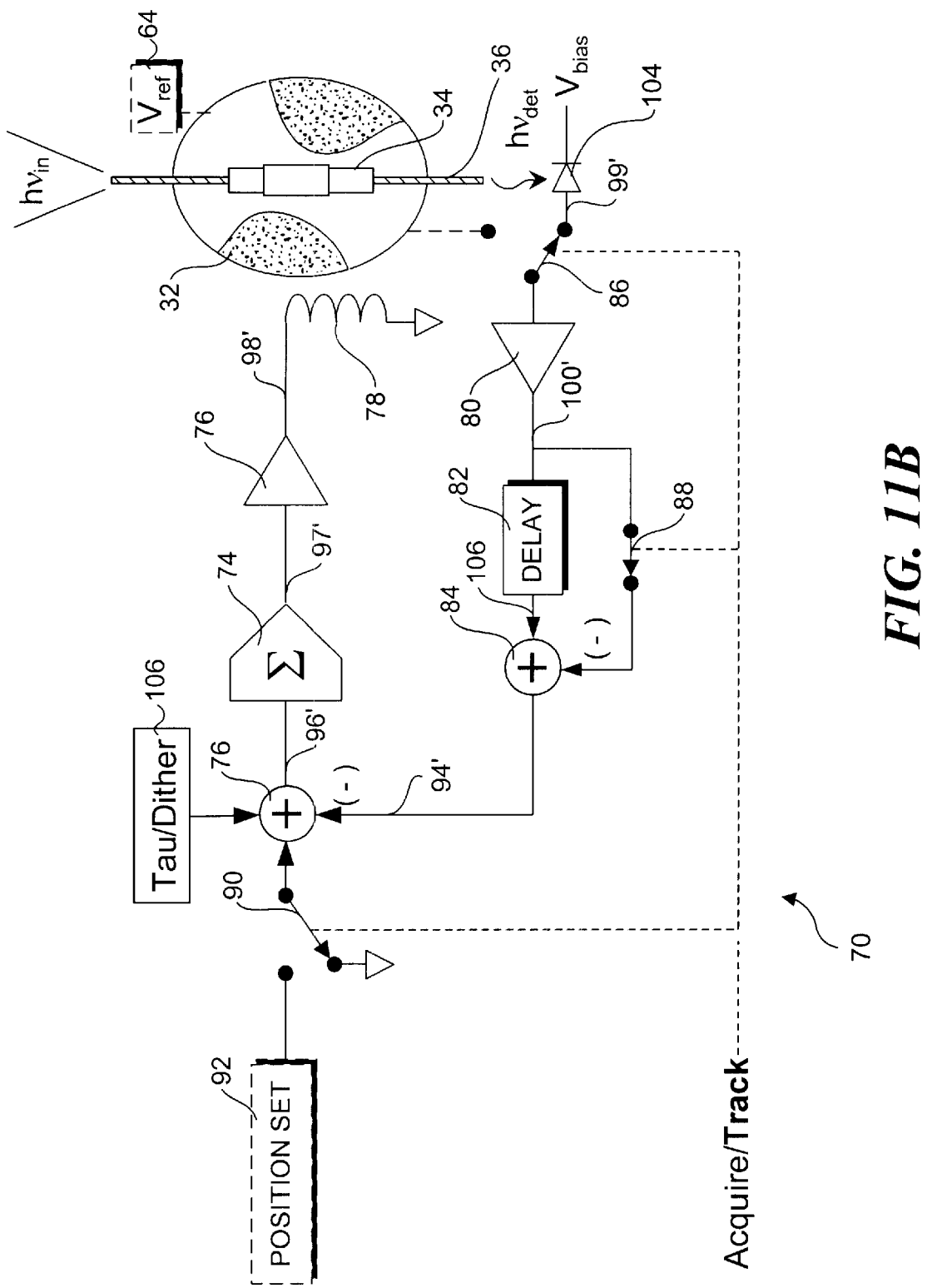
FIG. 11B depicts the control loop when used during a Tracking mode.

A linear servo control loop 70 suitable for both an acquire mode and a tracking mode is shown in FIGS. 11A and 11B. Servo control loop 70 includes a summing block 72, an integrator 74, an amplifier 76, and electromagnetic field 78, an amplifier 80, a delay block 82, and a summing block 84. Switches 86, 88, and 90 are used to switch between the Acquire mode shown in FIG. 11A, and the Track mode shown in FIG. 11B.

With reference to FIG. 11A, servo control loop 70 works in the following manner when in the Acquire mode. The Acquire mode is used to move armature 34 to a desired coordinate position and orientation, whereby the Tracking mode can be implemented. Accordingly, this desired coordinate position and orientation is called the pre-tracking position.

A position set signal 92 corresponding to a predetermined voltage is received as an external input at summing block 72, from which a feedback signal 94 is subtracted. The resultant error signal 96 is fed into integrator 74, which outputs an integrated error signal 97 that is received by amplifier 76 to generate a current 98 that drives electromagnetic field 78. In response to electromagnetic field 78, conductor 60 is caused to be positioned based on the interaction between the electromagnetic field and magnetic fluid 32. A leading electrode 52$_L$ L receives a voltage reference signal 64, which is electrically coupled to a trailing electrode 52$_T$ via magnetic fluid 32 and conductor 60, producing a voltage 99 based on resistive losses R$_L$ and R$_T$. Voltage 99 is then fed into amplifier 80, which produces a signal 100 that is received by delay block 82. As switch 88 is open in the Acquire mode, the signal produced by delay block 84 corresponds to feedback signal 94 since this signal is the only one signal going into summing block 84, which acts as a simple pass through in this instance, thereby completing the loop.

As will be recognized by those skilled in the art, signal 96 represents an error signal that will be reduced over time until conductor 60 is positioned to produce a feedback voltage 94 equal to position set voltage 92, thereby reaching the acquired position. It will be further understood that similar servo control loops (not shown) corresponding to each of electrodes 52E$_L$, 52F$_L$, 52G$_L$, 52E$_T$, 52F$_T$, and 52G$_T$ are applied to position conductor 60 (and thus armature 34) at the desired pre-tracking position. Furthermore, in a preferred configuration, each electrode is placed proximate to a corresponding electromagnetic, thereby substantially decoupling the servo control loops. In addition, capacitance measurements can be used in place of the resistance measurements when using the signal processing circuit of FIG. 10B.

The Tracking mode is use to finely tune the position of armature 34, thereby controlling the position of an end portion of fiber optic cable 36. The Tracking mode may be used to serve for aligning both a transmitted and received signals. When used for transmitting, the Tracking mode controls the position and/or orientation of an end portion of fiber optic cable 36 from which an optical signal (e.g., laser or light beam, etc.) exits. In general, the optical communications signal exiting the fiber optic cable is directed at a lens, which collimates the signal. As the signal leaves the end portion of the fiber optic cable, it disperses. As a result, to have a maximum amount of light be received by the lens, the end portion of the fiber optic cable should coincide with the focal point of the lens. In addition, it is generally desirable to direct the optical signal at a certain portion of the lens, such as the center of the lens. This is controlled by controlling the orientation of armature 34 in addition to the XYZ coordinate position of the end portion of fiber optic cable 36.

When used for receiving signals, a similar but reverse configuration is generally encountered. For instance, an incoming optical signal will be received by a lens, which then directs the light to its focal point. Accordingly, it is desired to place the end portion of the fiber optic cable so that it is coincident with the focal point of the lens. In this case, the coordinate position of the armature is critical, and the orientation is less important.

With reference to FIG. 11B, servo control loop 70 works in the following manner when operating in the Tracking mode. In this mode, a Tau/Dither signal 102 used for finely adjusting the position of armature 34 is received at summing block 76, from which a feedback signal 94' is subtracted to produce an error signal 96'. In the Tracking mode, there is no input from position set 92, so switch 90 is moved to tie the signal line to ground, or other reference voltage. As before, error signal 96' is integrated by integrator 74 to produce an integrated error signal 97', which is then input to amplifier 76 to produce a current 98 that drives electromagnetic field 78. As discussed above, the objective in the tracking mode is to position the end portion of fiber optic cable 36 (by positioning armature 34) so as to maximize the optical signal strength (i.e., the energy level of the light) either exiting from or being received by the end portion, depending on whether the fiber optic cable is being used for transmitting or receiving the signal. For simplicity, the energy level in both cases is represented by $hv_{det}$, which is measured at a detector 104. In the case of a received optical signal, $hv_{det}$ will be a function of an energy level $hv_{in}$ received at the end portion of fiber optic cable 36. In the case of a transmitted optical signal, $hv_{in}$ represents an energy level of the optical signal within fiber optic cable 36, while $hv_{det}$ corresponds to an energy level of an optical signal measured at a detector 104 that receives light from the collimated light signal produced by the lens.

Therefore, detector 104 will produce a signal 99' that is a function of the position of armature 34 and is received by amplifier 80, which produces an output signal 100'. Signal 100' is then fed into delay block 82 to produce a delayed signal 106 that is received by summing block 84. In contrast to the Acquire mode, switch 88 is closed in the Tracking mode, thereby enabling signal 100 to be provided as a negative input to summing block 84. As a result, signal 100 is subtracted from delayed signal 106, thereby providing a differentiation function, i.e., Dv/Dt, the results of which comprise feedback signal 94'.

As will be recognized by those skilled in the art, servo control loop 70 may be implemented using conventional analog and/or digital blocks, or the entire servo control loop may be implemented digitally using an appropriately programmed digital signal processor, ASIC (application specific integrated circuit), microcontroller or similar type of processing device.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive. Furthermore, it is not intended that the scope of the invention in any way be limited by the above description, but instead be determined entirely by reference to the claims that follow.

What is claimed is:

1. An apparatus, comprising:
    a non-magnetic body having a cavity defined therein in which a magnetic fluid is disposed;
    an armature disposed within the magnetic fluid, adapted to secure an end portion of a fiber optic cable along a longitudinal axis thereof;
    a controllable active magnetic field-generating structure disposed in proximity to the cavity and being capable of generating a variable magnetic field acting on the magnetic fluid that may be controlled so as to enable the armature to be moved to a desired coordinate position and/or orientation angle; and
    a static magnetic field-generating structure, disposed proximate to the non-magnetic body and generating a fixed magnetic field that holds the magnetic fluid within the cavity in the absence of the variable magnetic field.

2. The apparatus of claim 1, wherein the static magnetic field-generating structure comprises a plurality of permanent magnets radially disposed about the cavity.

3. The apparatus of claim 2, wherein the controllable active magnetic field-generating structure comprises a plurality of electromagnets radially disposed about the cavity.

4. The apparatus of claim 3, wherein the armature has a midpoint, and wherein the plurality of electromagnets comprise a set of leading electromagnets radially disposed about a centerline of the cavity and positioned along the centerline so as to be disposed on a first side of the midpoint and a set of trailing electromagnets radially disposed about the centerline of the cavity and positioned along the centerline so as to be disposed on a second side of the midpoint opposite of the first side.

5. The apparatus of claim 1 wherein a Z-axis is defined to be coincident with the centerline of the cavity, and where the variable magnetic field may be controlled such that the armature may be linearly positioned at a desired location along the Z-axis.

6. The apparatus of claim 1, wherein the non-magnetic body comprises a non-magnetic tube.

7. The apparatus of claim 1, wherein the armature is substantially symmetrical about its longitudinal axis and wherein outer portions of the armature have a larger cross section than a center portion of the armature, thereby forming an inclined plane when moving from the center portion toward each outer portion.

8. An apparatus, comprising:
    a non-magnetic body having a cavity defined therein in which a magnetic fluid is disposed;
    an armature disposed within the magnetic fluid, adapted to secure an end portion of a fiber optic cable along a longitudinal axis thereof; and
    a controllable active magnetic field-generating structure disposed in proximity to the cavity and being capable of generating a variable magnetic field acting on the magnetic fluid that may be controlled so as to enable the armature to be moved to a desired coordinate position and/or orientation angle, comprising:
        a plurality of electromagnet stators radially disposed about the cavity, each stator including a substantially U-shaped core having a center portion and a pair of arms extending therefrom, each arm having an end portion extending inward toward the cavity; and
        a pair of coils, disposed about respective arms of the core.

9. The apparatus of claim 8, further wherein each electromagnetic stator further comprises a permanent magnet centrally disposed within the U-shaped core and having a first pole in substantial contact with the center portion of the core and a second pole disposed in proximity to the magnetic fluid.

10. The apparatus of claim 8, wherein said plurality of stators comprise three stators radially disposed about the cavity with an angular spacing of approximately 120 degrees.

11. The apparatus of claim 8, wherein said plurality of stators comprise four stators radially disposed about the cavity with an angular spacing of approximately 90 degrees.

12. An apparatus, comprising:
    a non-magnetic body having a cavity defined therein in which a magnetic fluid is disposed;
    an armature disposed within the magnetic fluid, adapted to secure an end portion of a fiber optic cable along a longitudinal axis thereof;
    a controllable active magnetic field-generating structure disposed in proximity to the cavity and being capable of generating a variable magnetic field acting on the magnetic fluid that may be controlled so as to enable the armature to be moved to a desired coordinate position and/or orientation angle; and
    an integrated position sensor capable of detecting a position of the armature.

13. The apparatus of claim 12, wherein the integrated position sensor comprises:
    a conductor disposed about a center portion of the armature;
    a plurality of electrodes, fixedly disposed relative to the non-magnetic body so as to be in electrical contact with the magnetic fluid;
    means for measuring a resistance between each electrode and the conductor; and
    processing means for determining a coordinate position and/or orientation of the conductor based on the resistances between each electrode and the conductor that are measured.

14. The position sensor of claim 13, wherein said plurality of electrodes are disposed radially about the cavity.

15. The position sensor of claim 13, wherein said plurality of electrodes comprises a set of leading coplanar electrodes disposed on a first side of the conductor, and a set of trailing coplanar electrodes disposed on an opposite side of the conductor.

16. The apparatus of claim 12, wherein the integrated position sensor comprises:
   a conductor disposed about a center portion of the armature;
   a plurality of electrodes, fixedly disposed relative to the non-magnetic body so as to be in electrical contact with the magnetic fluid;
   means for measuring a capacitance between each electrode and the conductor; and
   processing means for determining a coordinate position and/or orientation of the conductor based on the capacitances between each electrode and the conductor that are measured.

17. An apparatus, comprising:
   a non-magnetic body having a cavity defined therein in which a magnetic fluid is disposed;
   a first armature disposed within a first portion of the magnetic fluid, adapted to secure an end portion of a first fiber optic cable along a longitudinal axis thereof; and
   a first controllable active magnetic field-generating structure disposed in proximity to the non-magnetic body and being capable of generating a first variable magnetic field acting on the first portion of the magnetic fluid that may be controlled so as to enable the first armature to be moved to a first desired coordinate position and/or orientation angle; and
   a second armature disposed within a second portion of the magnetic fluid, adapted to secure an end portion of a second fiber optic cable along a longitudinal axis thereof; and
   a second controllable active magnetic field-generating structure disposed in proximity to the non-magnetic body and being capable of generating a second variable magnetic field acting on the second portion of the magnetic fluid that may be controlled so as to enable the second armature to be moved to a second desired coordinate position and/or orientation angle.

18. The apparatus of claim 17, further comprising:
   a first static magnetic field-generating structure, disposed proximate to the non-magnetic body and generating a first fixed magnetic field that holds the first portion of magnetic fluid within the cavity in the absence of the first variable magnetic field; and
   second static magnetic field-generating structure, disposed proximate to the non-magnetic body and generating a second fixed magnetic field that holds the second portion of magnetic fluid within the cavity in the absence of the second variable magnetic field.

19. A method for positioning a stylus comprising:
   coupling the stylus to an armature disposed within a magnetic fluid;
   applying a continuous magnetic field to the magnetic fluid to hold the magnetic fluid within an open-ended cavity; and
   applying a variable magnetic field to the magnetic fluid to control a displacement and/or angular orientation of the armature, thereby controlling a position and/or angular orientation of the stylus.

20. The method of claim 19, wherein the variable magnetic field is produced by a controllable active magnetic field-generating structure comprises a plurality of electromagnets radially disposed about a cavity in which the magnetic fluid is disposed.

21. The method of claim 20, wherein the armature has a midpoint, and wherein the plurality of electromagnets comprise a set of leading electromagnets radially disposed about a centerline of the cavity and positioned along the centerline so as to be disposed on a first side of the midpoint and a set of trailing electromagnets radially disposed about the centerline of the cavity and positioned along the centerline so as to be disposed on a second side of the midpoint opposite of the first side.

22. The method of claim 21, wherein a Z-axis is defined to be parallel to the centerline of the cavity, and each of the plurality of electromagnets comprises a set of windings and produces magnetic fields of similar strength when an equal current is applied to those windings, and wherein the armature can be displaced along the Z-axis by applying a greater current to windings corresponding to one of the set of leading or trailing electromagnets when compared to the current supplied to the windings of the other set of electromagnets.

23. The method of claim 20, wherein the controllable active magnetic field-generating structure comprises:
   a plurality of electromagnet stators radially disposed about the centerline of the cavity, wherein each stator comprises:
      a substantially U-shaped core having a center portion and a pair of arms extending therefrom, each arm having an end portion extending inward toward the cavity; and
   a pair of coils, disposed about respective arms of the core.

24. The method of claim 19, further comprising:
   sensing a position of the armature; and
   providing a control signal based on an error between a current position of the armature that is sensed and a desired position to cause the variable electromagnetic field to be changed such that the armature is moved toward the desired position.

25. A method for positioning an end portion of a fiber optic cable:
   coupling the end portion of the fiber optic cable to an armature disposed within a magnetic fluid;
   applying a variable magnetic field to the magnetic fluid to control a displacement and/or angular orientation of the armature, thereby controlling a position and/or angular orientation of the end portion of the fiber optic cable;
   positioning the armature so that a light beam exiting the end portion of the fiber optic cable is directed at a receiving component
   measuring an energy level received by the receiving component; and
   providing a control signal based on the amount of energy measured at the receiving component to cause the variable electromagnetic field to be changed such that the end of the fiber optic cable is positioned to provide a maximal energy level received at the receiving component.

26. A method for positioning an end portion of a fiber optic cable:
   coupling the end portion of the fiber optic cable to an armature disposed within a magnetic fluid;
   applying a variable magnetic field to the magnetic fluid to control a displacement and/or angular orientation of the armature, thereby controlling a position and/or angular orientation of the end portion of the fiber optic cable;
   positioning the armature so that a light beam is received at the end portion of the fiber optic cable;
   measuring an energy level received at the end portion of the fiber optic cable; and providing a control signal based on the amount of energy received at the end portion of the fiber optic cable to cause the variable electromagnetic field to be changed such that the end of the fiber optic cable is positioned to provide a maximal energy level received at the end portion of the fiber optic cable.

* * * * *